United States Patent [19]

Hess

[11] Patent Number: 4,614,545

[45] Date of Patent: Sep. 30, 1986

[54] HYDROXYPROPYL METHYL CELLULOSE THICKENING AGENTS FOR ORGANIC LIQUIDS

[75] Inventor: Roland H. P. Hess, Au, Switzerland

[73] Assignee: The Dow Chemical Company, Midland, Mich.

[21] Appl. No.: 765,788

[22] Filed: Aug. 15, 1985

[51] Int. Cl.$^4$ .......................... C08L 1/08; C08G 56/68
[52] U.S. Cl. ..................................... 106/169; 106/170; 106/176; 106/178; 106/186; 106/187; 106/188; 106/189; 106/190; 106/197.1; 536/88; 536/91
[58] Field of Search ............... 106/170, 197.1, 189, 169, 106/178, 176, 186–190; 536/91, 88

[56] References Cited

U.S. PATENT DOCUMENTS

| | | | |
|---|---|---|---|
| 2,831,852 | 4/1958 | Savage | 536/91 |
| 3,256,111 | 6/1966 | Singiser | 106/197.1 |
| 3,493,407 | 2/1970 | Greminger, Jr. | 106/197.1 |
| 4,096,325 | 6/1978 | Teng et al. | 536/91 |

Primary Examiner—Theodore Morris

[57] ABSTRACT

Hydroxypropyl cellulose ethers which have a methoxyl substitution of from 21% to 35% and a hydroxypropoxyl substitution of from 14% to 35% and which have a viscosity of at least about 50 mPa·s as a 2 weight percent aqueous solution are useful as thickening agents for organic liquids, optionally mixed with water.

13 Claims, No Drawings

HYDROXYPROPYL METHYL CELLULOSE THICKENING AGENTS FOR ORGANIC LIQUIDS

BACKGROUND OF THE INVENTION

The invention relates to the use of hydroxypropyl methyl cellulose ethers for thickening an organic liquid or a mixture of an organic liquid with water. Furthermore, the invention relates to thickened organic liquids or mixtures thereof with water which comprise hydroxypropyl methyl cellulose ethers as thickening agents.

Hydroxypropyl methyl cellulose ethers (HPMC ethers) have been known for a long time and have found wide acceptance for many applications, for example as suspension stabilizers for polymerisation reactions and thickeners in aqeous systems. A process for preparing them is for example described in U.S. Pat. No. 2,949,452.

From U.S. Pat. No. 3,388,082 water soluble HPMC ethers are known which have a methoxyl degree of substitution (DS) of from 0.4 to 1.3, a hydroxypropyl molar substitution (MS) of from 0.2 to 1.4 and a total molar substitution of at least 1.0. The DS/MS values of 0.4/0.2; 0.4/1.4; 1.3/0.2 and 1.3/1.4 can be calculated as percent of methoxyl substitution/hydroxypropoxyl substition. The corresponding weight percent values are 7%/8.3%; 4.8%/43%; 21%/7.8% and 15.2%/40.8% respectively. HPMC ethers which have a methoxyl substitution of from 27% to 30% and a hydroxypropoxyl substitution of from 4% to 7.5%, HPMC ethers which have a methoxyl substitution of from 28% to 30% and a hydroxypropoxyl substitution of from 7% to 12%, HPMC ethers which have a methoxyl substitution of from 19% to 24% and a hydroxypropoxyl substitution of from 4% to 12% and HPMC ethers which have a methoxyl substitution of from 16.5% to 20% and a hydroxypropoxyl substitution of from 23% to 30% are commercially available. These hydroxypropyl methyl cellulose ethers are wellknown as thickeners. While these cellulose ethers are useful in aqueous systems, unfortunately their use in organic liquids is limited because of their limited solubility in many organic solvents. However, the thickening of organic liquids, optionally containing water, is often desirable for a variety of reasons such as to impart consistency (e.g. to gel alcohol fuel), to control rheology of and to provide adhesion to a substrate e.g. in paint remover formulations and to impart workability to non-aqueous mineral binder/filler systems (e.g. gypsum bandages).

In U.S. Pat. No. 3,617,588 a preparation of cellulose ether films, for example pharmaceutical capsule shells, is disclosed. The cellulose ethers are $C_{2-4}$ hydroxyalkyl $C_{1-2}$ alkyl cellulose ethers which have a DS of 0.6 to 2.0 and a MS of 0.07 to 1.0 and which are characterised by a viscosity of 2–20 mPa·s as a 2 weight percent aqueous solution at 20° C. Specifically HPMC ethers are disclosed which have DS of 1.8 to 2 and a MS of 0.15 to 0.35 which corresponds to a methoxyl substitution of 28% to 31% and a hydroxypropoxyl substitution of 6% to 13%. U.S. Pat. No. 3,493,407 discloses a process for preparing medical capsules from a solution of HPMC ethers with a methoxyl content of 18 to 32 weight percent and a hydroxypropyl content of 4 to 15 weight percent and which is characterised by a viscosity of 2 to 20 mPa·s as a 2 weight percent aqueous solution at 20° C. Unfortunately, these HPMC ethers are not very useful as thickeners since a very large amount of HPMC is required to obtain a substantial thickening effect.

In view of the deficiencies of the above mentioned HPMC ethers which are presently known as thickening agents it is highly desirable to provide new HPMC thickening agents for organic liquids.

A useful thickening agent of the HPMC ether type for organic solvents is disclosed in U.S. Pat. No. 3,839,319. The HPMC ethers have a DS of 0.2 to 1.0 and a MS of at least 1.5. The hydroxypropoxyl substitution of such HPMC ethers, expressed as weight percent, is more than 40%. Unfortunately, production on large scale has shown that the HPMC ethers of such a high hydroxypropoxyl substitution are difficult to be dried by application of heat since these HPMC ethers have thermoplastic properties. Generally heat-drying is however preferred. Accordngly it still remains highly desirable to provide a further class of HPMC ethers which are useful for thickening organic liquids.

SUMMARY OF THE INVENTION

One aspect of the invention comprises a method for thickening an organic liquid or a mixture thereof with water by adding a thickening amount of a hydroxypropyl methyl cellulose ether which has a methoxyl substitution of from 21% to 35%, a hydroxypropoxyl substitution of from 14% to 35% and a sum of the methoxyl and hydroxypropoxyl substitution of from 35% to 70% and which has a viscosity of at least about 50 mPa·s as a 2 weight percent aqueous solution at 20° C.

Another aspect of the invention is a thickened organic liquid or a thickened mixture thereof with water which is characterised in that it contains a thickening amount of a hydroxypropyl methyl cellulose ether which has a methoxyl substitution of from 21% to 35%, a hydroxypropoxyl substitution of from 14% to 35% and a sum of the methoxyl and hydroxypropoxyl substitution of from 35% to 70% and which HPMC ether has a viscosity of at least about 50 mPa·s as a 2 weight percent aqueous solution at 20° C.

Another aspect of the invention is a hydroxypropyl methyl cellulose ether which has a methoxyl substitution of from 21% to 35%, a hydroxypropoxyl substitution of from 14% to 35% and a sum of the methoxyl and hydroxypropoxyl substitution of 35% to 70% and which has a viscosity of at least 50 mPa·s as a 2 weight percent aqueous solution at 20° C. for use as a thickening agent for an organic liquid or a mixture thereof with water.

Surprisingly, a considerable viscosity increase of many organic liquids, optionally mixed with water, can be obtained by the addition of the above mentioned HPMC ethers.

From U.S. Pat. No. 4,389,393 it is known to use hydroxypropoxyl methyl cellulose ethers having a methoxyl substitution of 16–24 weight %, a hydroxypropoxyl substitution of from 4–32 weight % and an average molecular weight of at least 50,000 as a carrier base material which is useful in sustained release therapeutic compositions. U.S. Pat. No. 2,831,852 discloses water-soluble thermoplastic cellulose ethers having a methoxyl substitution of from 25 to 30 weight percent and a hydroxypropoxyl substitution of from 10 to 14 weight percent. However, it is not suggested to use these HPMC ethers for thickening organic liquids.

HPMC ethers which have a methoxyl substitution of from 21 to 35% and a hydroxypropoxyl substitution of from 15 to 35% and their use as suspending agents for the suspension polymerisation of vinyl chloride are described in the applicant's copending U.S. patent application Ser. No. 706,829, filed Feb. 28, 1985.

DETAILED DESCRIPTION OF THE INVENTION

The HPMC ethers which are used for thickening an organic liquid or a mixture of an organic liquid with water are defined primarily by their methoxyl substitution and hydroxypropoxyl substitution.

The methoxyl and hydroxypropoxyl substitution have been measured and calculated according to ASTM-D 1347-72 and ASTM-D 2363-72 respectively.

All the percentages of substitution are by weight of the finally substituted material.

The methoxyl substitution of the hydroxypropyl methyl cellulose ethers ranges from 21%, preferably from 22%, most preferably from 24%; to 35%, preferably to 32%, most preferably to 30%.

The hydroxypropoxyl substitution of the hydroxylpropyl methyl cellulose ethers ranges from 14%, preferably from 16%, most preferably from 18%; to 35%, preferably to 32%, most preferably to 30%.

The sum of the percentage of the methoxyl and hydroxypropoxyl substitution is at least 35%, preferably at least 40%, most preferably at least 44%.

The upper limit of the sum of the methoxyl and hydroxypropoxyl substitution is 70%, preferably 65%, most preferably 58%.

Especially preferred hydroxypropyl methyl cellulose ethers for the purpose of the invention have a methoxyl substitution of from 24% to 30% and a hydroxypropoxyl substitution of from 18% to 30%. The most preferred HPMC ethers have a methoxyl and hydroxylpropoxyl substition of at least about 25% each.

The molecular weight of the HPMC ethers can be expressed as the viscosity of the solution thereof in a solvent therefor. Unless otherwise stated, the molecular weight of a HPMC ether is given herein as the viscosity of a 2 weight percent solution of the HPMC ether in water as measured using a UBBELOHDE viscosimeter at 20° C. The viscosities of aqueous solutions of the HPMC ethers which are used as thickening agents according to the invention are at 20° C. at least about 50 mPa·s, preferably at least about 1,000 mPa·s, more preferably at least about 15,000 mPa·s. The viscosities of said solutions are generally up to about 150,000 mPa·s, preferably to about 100,000 mPa·s, more preferably to about 75,000 mPa·s.

The number average molecular weight ($\overline{M}_n$) can be determined by osmotic pressure determinations. The number average molecular weight ($\overline{M}_n$) is generally from about 20,000, preferably from about 55,000, more preferably from about 120,000; generally to about 280,000, preferably to about 250,000, more preferably to about 220,000.

The hydroxypropyl methyl cellulose ethers used as thickening agents for organic liquids optionally mixed with water, can be produced according to known methods, for example as described in U.S. Pat. Nos. 2,831,852, 2,949,452, 3,388,082, 4,410,693 and 4,456,751 the teachings of which are included herein by reference. The levels of substitution of the hydroxypropyl methyl cellulose ethers of the present invention can be achieved by increasing the amounts of propylene oxide and methyl chloride and reaction times until the desired substitution level has been reached.

By adding the above mentioned HPMC ethers to an organic liquid or to mixtures thereof with water thickened liquids of a wide range of desired viscosities can be obtained. The solubility of the HPMC ethers depends on a variety of factors, e.g. on the level of substitution and on the average molecular weight of the HPMC ethers, on the polarity of the organic liquid and on the type(s) and amount of functional groups of the organic liquid.

By an 'organic liquid' an organic solvent or a mixture of organic solvents is meant which are liquid at ambient pressure and ambient or slightly elevated temperature, i.e. up to 50° C.

In general, at least one component of the organic liquid should comprise one or more heteroatoms if the organic liquid is not mixed with water. Preferred heteroatoms are sulfur, nitrogen, oxygen or halogen, e.g. chlorine or bromine. Preferably, the organic liquid comprises one or more polar groups like for example

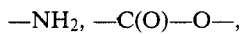

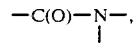

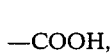—COOH,

or —OH.

The most preferred organic liquids are aliphatic or cycloaliphatic alcohols, e.g. methyl alcohol (MeOH), ethyl alcohol (EtOH) (preferably technical grade), isopropyl alcohol (e.g. comprising up to about 10% water), tertiary butanol, cyclohexanol, dipropylene glycol methyl ether, 2-ethoxyethanol, methoxyethanol and 2-butoxyethanol which are commercially available as CELLOSOLVE, METHYLCELLOSOLVE and BUTYLCELLOSOLVE respectively; aliphatic or cycloaliphatic ketones, e.g. acetone, methyl ethyl ketone or cyclohexanone, carboxylic acids, e.g. formic acid, acetic acid or lactic acid; carboxylic acid esters, e.g. methyl acetate and butyl acetate; one or more halogen atoms containing solvents, e.g. methylene chloride, chloroform or ethylene chlorohydrin; aliphatic and cycloaliphatic ethers, e.g. cyclohexanone, tetrahydrofuran or dioxane; amines, e.g. pyridine, N-methyl-2-pyrolidon or morpholine; amides, e.g. dimethyl formamide and sulfur atoms containing organic solvents, e.g. dimethyl sulfoxide.

The organic solvents generally comprise up to 10 carbon atoms, preferably up to 6 carbon atoms.

Useful mixtures of organic liquids, optionally mixed with water, are for example mixtures of t-butanol/water, acetone/water, glycerin/water, methylene chloride/methanol and methylene chloride/ethanol.

The HPMC ethers described above can also be used for thickening hydrocarbons if the hydrocarbons are mixed with an organic solvent comprising at least one heteroatom. Preferred examples of such mixtures are benzene/ethanol, toluene/ethanol, naphtha/ethanol and xylene/isopropyl alcohol.

The HPMC ethers described above are particularly useful for thickening polar organic liquids or mixtures thereof with water.

The term 'thickened organic liquid or a thickened mixture thereof with water' as used herein means an organic liquid or a mixture of organic liquids, optionally mixed with water, which has been thickened with a HPMC ether described above.

After addition of the HPMC ether, the organic liquid, optionally mixed with water, is generally in the form of a viscous, still pourable liquid or in the form of a highly viscous gel. The viscosity of the viscous liquid, gel or slurry is generally adjustable almost to any desired level by the appropriate selection of type, weight amount and molecular weight of the HPMC ether. For example, addition of a small amount of low molecular weight HPMC ether may raise the viscosity of a given organic liquid by only a few mPa·s, while a larger amount of a high molecular weight product may increase the viscosity of the organic liquid by over 100,000 mPa·s. As an example, an addition of 2% by weight of a HPMC ether having an average molecular weight of about 21,000 (which is characterised by a viscosity of about 75 mPa·s as 2 weight percent aqueous solution) to ethanol will result in a viscosity of about 100 mPa·s, while the addition of 4% by weight of a HPMC ether having an average molecular weight of about 220,000 to ethanol will result in a viscosity of about 150,000 mPa·s.

Depending on its intended use, the viscosity of the viscous liquid or gel or slurry is generally from about 100 mPa·s, preferably from about 1,000 mPa·s, most preferably from about 5,000 mPa·s; to about 180,000 mPa·s, preferably to about 150,000 mPa·s.

'Thickened' means that the viscosity increase of the organic liquid, optionally mixed with water, by the addition of the HPMC ether is at least 10 mPa·s, preferably at least 500 mPa·s, more preferably at least 4,000 mPa·s, most preferably at least 10,000 mPa·s. A 'thickening amount' of a HPMC ether is an amount sufficient to provide this viscosity increase. The amount of HPMC ethers which is required to provide the desired viscosity increase depends on a variety of factors, e.g. on the molecular weight (i.e. on its viscosity as a 2 weight percent aqueous solution), on the methoxyl and the hydroxypropoxyl substitution of the HPMC ether and on the type of organic liquid. Generally, from about 0.05% to about 10%, preferably from about 0.1% to about 5% by weight is added to the organic liquid or a mixture thereof with water.

In Tables I to IV, the viscosities of different thickened organic liquids, optionally mixed with water, are shown. The HPMC ethers of examples 1 to 9 are thickening agents used for the purpose of the present invention whereas the HPMC ethers of comparative examples A to C are known thickening agents.

In all examples and comparative examples, the concentrations of the hydroxypropyl methyl cellulose ethers are 2 weight percent, based on the weight of the organic liquid. The viscosities are measured on a BROOKFIELD RVT equipment at 20° C., 20 minutes (Tables I and II), and 24 hours (Tables III and IV) after the cellulose ether has been added to the solvent.

In Tables I to VI, the methoxyl and hydroxypropoxyl substitution of the HPMC ethers are listed in column 1. The viscosities of a 2 weight % solution of the HPMC ethers in water as measured using an UBBELOHDE viscosimeter at 20° C. are listed in column 2 of Tables I to VI for characterising the molecular weights of the HPMC ethers.

TABLE I

| METHOXYL/ HYDROXY- PROPOXYL SUBSTITUTION | VISCOSITY (mPa · s) after 20 minutes in | | | | |
|---|---|---|---|---|---|
| | WATER | ETHANOL 96 wt % | CHLOROFORM | DIOXANE | N—METHYL- 2-PYRROLI- DONE |
| EXAMPLES | | | | | |
| 1. (21/31) | 150 | 20 | 40 | 20 | 80 |
| 2. (29/15) | 508 | 30 | 8000 | 190 | 280 |
| 3. (29/18) | 72000 | 3000 | >150000 | 13400 | 10000 |
| 4. (25/18) | 59 | 20 | 190 | 30 | 60 |
| 5. (21/23) | 363 | 70 | 700 | 260 | 70 |
| 6. (32/14) | 348 | 140 | 1500 | 250 | 130 |
| 8. (29/20) | 25000 | 1200 | >100000 | 5000 | 140 |
| 9. (26/30) | 158 | 70 | 800 | 80 | 100 |
| COMPARATIVE EXAMPLES | | | | | |
| A. (18/28) | 5000 | 10 | 10 | 20 | 1550 |
| B. (29/10) | 4000 | 10 | 3850 | 20 | 60 |
| C. (22/08) | 4000 | 10 | 10 | 20 | 1200 |

TABLE II

| METHOXYL/ HYDROXY- PROPOXYL SUBSTITUTION | VISCOSITY (mPa · s) after 20 minutes in | | | | |
|---|---|---|---|---|---|
| | WATER | PROPYLENE GLYCOL | 2-ETHOXY- ETHANOL | CYCLO- HEXANONE | DIPROPYLENE GLYCOL METHYL ETHER |
| EXAMPLES | | | | | |
| 1. (21/31) | 150 | 60 | 20 | 10 | 15 |
| 2. (29/15) | 508 | 60 | 30 | 10 | 15 |
| 3. (29/18) | 72000 | 60 | 675 | 10 | 20 |
| 4. (25/18) | 59 | 60 | 10 | 10 | 10 |
| 5. (21/23) | 363 | 60 | 110 | 20 | 30 |
| 6. (32/14) | 348 | 60 | 80 | 10 | 10 |
| 7. (29/22) | 82 | 60 | 50 | 30 | 30 |
| 8. (29/30) | 25000 | 60 | 1900 | 20 | 20 |

TABLE II-continued

| METHOXYL/ HYDROXY- PROPOXYL SUBSTITUTION | VISCOSITY (mPa · s) after 20 minutes in | | | | |
|---|---|---|---|---|---|
| | WATER | PROPYLENE GLYCOL | 2-ETHOXY- ETHANOL | CYCLO- HEXANONE | DIPROPYLENE GLYCOL METHYL ETHER |
| 9. (26/30) | 158 | 60 | 100 | 40 | 20 |
| COMPARATIVE EXAMPLES | | | | | |
| A. (18/28) | 5000 | 60 | 10 | 10 | 10 |
| B. (29/10) | 4000 | 60 | 10 | 10 | 10 |
| C. (22/08) | 4000 | 60 | 10 | 10 | 10 |

TABLE III

| METHOXYL/ HYDROXY- PROPOXYL SUBSTITUTION | VISCOSITY (mPa · s) after 24 hours in | | | | |
|---|---|---|---|---|---|
| | WATER | ETHANOL 96 wt % | CHLOROFORM | DIOXANE | N—METHYL- 2-PYRRO- LIDONE |
| EXAMPLES | | | | | |
| 1. (21/31) | 150 | 20 | 140 | 20 | 100 |
| 2. (29/15) | 508 | 40 | 8700 | 290 | 310 |
| 3. (29/18) | 72000 | 10600 | >150000 | 29000 | 11700 |
| 4. (25/18) | 59 | 20 | 240 | 40 | 60 |
| 5. (21/23) | 363 | 130 | 650 | 260 | 80 |
| 6. (32/14) | 348 | 130 | 1350 | 250 | 160 |
| 7. (29/22) | 82 | 6800 | 370 | 370 | 7000 |
| 8. (29/20) | 25000 | 6900 | >100000 | 16000 | 160 |
| 9. (26/30) | 158 | 90 | 760 | 200 | 120 |
| COMPARATIVE EXAMPLES | | | | | |
| A. (18/28) | 5000 | 10 | 10 | 10 | 1800 |
| B. (29/10) | 4000 | 10 | 14000 | 20 | 250 |
| C. (22/08) | 4000 | 10 | 20 | 10 | 1250 |

TABLE IV

| METHOXYL/ HYDROXY- PROPOXYL SUBSTITUTION | VISCOSITY (mPa · s) AFTER 24 HOURS IN | | | | |
|---|---|---|---|---|---|
| | WATER | PROPYLENE GLYCOL | 2-ETHOXY- ETHANOL | CYCLO- HEXANONE | DIPROPYLENE GLYCOL METHYL ETHER |
| EXAMPLES | | | | | |
| 1. (21/31) | 150 | 90 | 50 | 10 | 15 |
| 2. (29/15) | 508 | 60 | 40 | 20 | 20 |
| 3. (29/18) | 72000 | 60 | 7350 | 30 | 20 |
| 4. (25/18) | 59 | 60 | 10 | 10 | 10 |
| 5. (21/23) | 363 | 60 | 270 | 60 | 30 |
| 6. (32/14) | 348 | 60 | 220 | 20 | 10 |
| 7. (29/22) | 82 | 60 | 60 | 40 | 30 |
| 8. (29/20) | 25000 | 70 | 8300 | 20 | 20 |
| 9. (26/30) | 158 | 80 | 160 | 170 | 20 |
| COMPARATIVE EXAMPLES | | | | | |
| A. (18/28) | 5000 | 70 | 10 | 10 | 10 |
| B. (29/10) | 4000 | 60 | 10 | 20 | 10 |
| C. (22/08) | 4000 | 70 | 10 | 20 | 10 |

Tables I to IV show that in most of the tested organic liquids the HPMC ethers used for the purpose of the present invention give higher viscosities and are accordingly better thickeners than HPMC ethers which are known for aqueous systems.

It is to be understood that the thickening effect of a given weight concentration of a HPMC ether in an organic liquid depends also on the molecular weight of the HPMC ether. The molecular weight of the HPMC ethers is generally expressed as the viscosity of a 2 weight percent solution thereof in water. Furthermore, the viscosity of the organic liquid itself also varies. The viscosity of ethanol (96 weight percent), chloroform, dioxane, 2-ethoxy-ethanol, cyclohexanone, N-methyl-2-pyrrolidone and dipropylene glycol methyl ether is 10 mPa·s and the viscosity or propylene glycol is 60 mPa·s, measured on a Brookfield RVT equipment at 20° C. For taking the molecular weights of the HPMC ethers and the viscosities of the organic solvent into account for evaluating the thickening effects of the HPMC ethers the viscosity of the unthickened solvent is deducted from the measured values in Tables III and IV. The resulting values are expressed as percent of the viscosity of the HPMC ethers in the water and are listed in Tables V and VI.

TABLE V

| METHYL/HYDROXY-PROPOXYL SUBSTITUTION | VISCOSITY (mPa · s) WATER | VISCOSITY after 24 hours (% of aq. viscosity after solvent viscosity has been deducted) | | | |
|---|---|---|---|---|---|
| | | ETHANOL 96 wt % | CHLOROFORM | DIOXANE | N—METHYL-2-PYRROLIDONE |
| EXAMPLES | | | | | |
| 1. (21/31) | 150 | 7 | 87 | 7 | 60 |
| 2. (29/15) | 508 | 6 | 1711 | 55 | 59 |
| 3. (29/18) | 72000 | 15 | >208 | 40 | 16 |
| 4. (25/18) | 59 | 17 | 390 | 51 | 85 |
| 5. (21/23) | 363 | 33 | 176 | 69 | 19 |
| 6. (32/14) | 348 | 34 | 385 | 69 | 43 |
| 7. (29/22) | 82 | 8290 | 439 | 85 | 8524 |
| 8. (29/20) | 25000 | 28 | >400 | 64 | 1 |
| 9. (26/30) | 158 | 51 | 475 | 127 | 70 |
| COMPARATIVE EXAMPLES | | | | | |
| A. (18/28) | 5000 | 0 | 0 | 0 | 36 |
| B. (29/10) | 4000 | 0 | 350 | 0 | 6 |
| C. (22/08) | 4000 | 0 | 0 | 0 | 31 |

TABLE VI

| METHYL/HYDROXY-PROPOXYL SUBSTITUTION | VISCOSITY (mPa · s) WATER | VISCOSITY after 24 hours (% of aq. viscosity after solvent viscosity has been deducted) | | | |
|---|---|---|---|---|---|
| | | PROPYLENE GLYCOL | 2-ETHOXY-ETHANOL | CYCLO-HEXANONE | DIPROPYLENE GLYCOL METHYL ETHER |
| EXAMPLES | | | | | |
| 1. (21/31) | 150 | 20 | 27 | 0 | 0 |
| 2. (29/15) | 508 | 0 | 6 | 2 | 1 |
| 3. (29/18) | 72000 | 0 | 10 | 0 | 0 |
| 4. (25/18) | 59 | 0 | 0 | 0 | 0 |
| 5. (21/23) | 363 | 0 | 72 | 14 | 4 |
| 6. (32/14) | 348 | 0 | 60 | 3 | 0 |
| 7. (29/22) | 82 | 0 | 61 | 37 | 18 |
| 8. (29/20) | 25000 | 0 | 33 | 0 | 0 |
| 9. (26/30) | 158 | 13 | 95 | 101 | 3 |
| COMPARATIVE EXAMPLES | | | | | |
| A. (18/28) | 5000 | 0 | 0 | 0 | 0 |
| B. (29/10) | 4000 | 0 | 0 | 0 | 0 |
| C. (22/08) | 4000 | 0 | 0 | 0 | 0 |

Although the thickening effect of the HPMC ethers of examples 1 to 9 and of comparative examples A to C varies depending on the organic liquid, tables V and VI illustrate that the thickening properties of the HPMC ethers of examples 1 to 9 are in most solvents considerably better than of comparative examples A to C.

In Table VII, the viscosities of the different organic liquids are shown which are thickened with the HPMC ether of example 3 and of comparative example B which is a commercially available thickener for aqueous systems.

The ratio of the solvents in the mixtures are weight ratios. The concentrations of the HPMC ethers are listed as percent, based on the weight of the organic liquid. The viscosities are measured on a Brookfield RVT equipment at 20° C., 24 hours after the HPMC ether has been added to the solvent.

The comparison of Example 3 with the comparative Example B illustrates that the HPMC ethers used as thickening agents in the present invention can provide considerably higher viscosities in mixtures of organic solvents than known HPMC thickening agents.

The thickened organic liquids can be used for many applications, for example as gelled alcohol fuel or as paint removers and in the manfacturing of gypsum bandages.

For illustrating how a HPMC ether useful for the purpose of the present invention can be prepared, reference is made to the following example which should not be construed to limit the invention:

TABLE VII

| SOLVENT | CONCENTRATION OF HPMC ETHER (WEIGHT %) | VISCOSITY (mPa · s) | |
|---|---|---|---|
| | | EXAMPLE 3 | COMPARATIVE EXAMPLE B |
| METHYLENE CHLORIDE (MeCl$_2$) | 1 | 11100 | 10 |
| MeCl$_2$/EtOH (98/2) | 1 | 8200 | 10 |
| MeCl$_2$/EtOH (94/6) | 1 | 5300 | 250 |
| MeCl$_2$/MeOH (94/6) | 1 | 5100 | 2150 |
| TOLUENE/EtOH (100/20) | 1.7 | 6800 | 10 |
| TOLUENE/EtOH (100/30) | 1.5 | 16200 | 10 |

PREPARATION OF A HPMC ETHER (EXAMPLE)

In a suitably sized reaction vessel equipped with agitator, temperature controls and vacuum line, 2 kilograms (kg) of ground cellulose are alkalised with 6.3 kg of 50 weight percent aqueous sodium hydroxide at about 30° C.

The vessel is then evacuated and after evacuation, 4.6 kg methyl chloride and 1.2 kg propylene oxide are added. The temperature in the vessel is subsequently increased from 30° C. to 90° C. After about 8 hours the HPMC ether is washed with water of about 90° C. and recovered and dried.

The resulting HPMC ether has a methoxyl substitution of 28% and a hydroxypropoxyl substitution of 21%. The viscosity of a 2 weight percent aqueous solution of the prepared HPMC ether is 75000 mPa·s, measured using an UBBELOHDE viscometer.

I claim:

1. A method for thickening an organic liquid or a mixture thereof with water by adding a thickening amount of a hydroxypropyl methyl cellulose ether which has a methoxyl substitution of from 21% to 35%, a hydroxypropoxyl substitution of from 18% to 35% and a sum of the methoxyl and hydroxypropoxyl substitution of from 39% to 70% and which has a viscosity of at least about 1,000 mPa·s as a 2 weight percent aqueous solution at 20° C.

2. The method of claim 1 wherein the added cellulose ether has a sum of the methoxyl and hydroxypropoxyl substitution of from 40% to 65%.

3. The method of claim 1 wherein the added cellulose ether has a methoxyl substitution of from 22% to 32% and a hydroxypropoxyl substitution of from 18% to 31%.

4. The method of claim 3 wherein the added cellulose ether has a methoxyl substitution of from 24% to 30% and a hydroxypropoxyl substitution of from 18% to 30%.

5. The method of claim 1 wherein the added cellulose ether has a methoxyl and a hydroxypropoxyl substitution of at least about 25% each.

6. The method of claim 1 wherein the added cellulose ether is characterised by its viscosity of about 1,000 mPa·s to about 150,000 mPa·s as a 2 weight percent aqueous solution.

7. The method of claim 6 wherein the added cellulose ether is characterised by its viscosity of about 15,000 mPa·s to about 100,000 mPa·s as a 2 weight percent aqueous solution.

8. A thickened organic liquid or a thickened mixture thereof with water characterised in that it contains a thickening amount of hydroxypropyl methyl cellulose ether which has a methoxyl substitution of from 21% to 35%, a hydroxypropoxyl substitution of from 18% to 35% and a sum of the methoxyl and hydroxypropoxyl substitution of from 39% to 70% and which cellulose ether has a viscosity of at least about 1,000 mPa·s as a 2 weight percent aqueous solution at 20° C.

9. The organic liquid or mixture thereof with water of claim 8 characterised in that its viscosity is from about 1,000 mPa·s to about 180,000 mPa·s.

10. The organic liquid or mixture thereof with water of claim 9 characterised in that its viscosity is from about 5,000 mPa·s to about 150,000 mPa·s.

11. The organic liquid or mixture thereof with water of claim 8 characterised in that at least one component of the liquid comprises one or more of the following groups or atoms

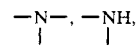

—NH$_2$, —C(O)—O—, —C(O)—N—, —COOH,

—O—, —OH or halogen.

12. The organic liquid or mixture thereof with water of claim 11 characterised in that at least one organic component is methylene chloride or ethanol.

13. A hydroxypropyl methyl cellulose ether which has a methoxyl substitution of from 21% to 35%, a hydropropoxyl substitution of from 18% to 35% and a sum of the methoxyl and hydroxypropoxyl substitution of from 39% to 70% and which has a viscosity of at least about 1,000 mPa·s as a 2 weight percent aqueous solution at 20° C. for use as a thickening agent for an organic liquid or a mixture thereof with water.

* * * * *